United States Patent [19]
Derrien et al.

[11] Patent Number: 5,324,065
[45] Date of Patent: Jun. 28, 1994

[54] SUSPENSION ASSEMBLY FOR A HEAVY VEHICLE, IN PARTICULAR FOR A TRACKED VEHICLE

[75] Inventors: Michel Derrien, Versailles; Philippe Brisedou, Fresnes, both of France

[73] Assignee: Messier-Bugatti, Velizy-Villacoublay, France

[21] Appl. No.: 7,970

[22] Filed: Jan. 22, 1993

[30] Foreign Application Priority Data

Jan. 27, 1992 [FR] France ................................ 92 00815

[51] Int. Cl.$^5$ ............................................. B60G 11/26
[52] U.S. Cl. ...................................... 280/705; 280/708; 280/688; 188/302; 188/306
[58] Field of Search ................ 280/705, 708, 711, 717, 280/688; 188/302, 306

[56] References Cited

U.S. PATENT DOCUMENTS

| | | | |
|---|---|---|---|
| 3,254,738 | 6/1966 | Larsen | 280/708 |
| 3,614,125 | 10/1971 | Sinclair | 280/705 |
| 4,700,970 | 10/1987 | Joseph | 280/705 |
| 4,721,328 | 11/1988 | Chauveau et al. | 280/705 |

FOREIGN PATENT DOCUMENTS 0220094 4/1987 European Pat. Off. .

Primary Examiner—Margaret A. Focarino
Assistant Examiner—Paul N. Dickson
Attorney, Agent, or Firm—Sixbey, Friedman, Leedom & Ferguson

[57] ABSTRACT

The invention relates to an oscillating arm suspension assembly for a heavy vehicle, in particular for a track vehicle. According to the invention, the oscillating arm comprises a housing receiving firstly a shock absorber of the type in which a semi-solid elastomer is hydrostatically compressed, said shock absorber being mounted coaxially about the oscillation axis of said arm, and secondly an oleo-pneumatic spring of the two-chamber type, having a hydraulic chamber closed by a sliding piston with a piston rod hinged thereto whose end opposite from the piston is hinged to a fixed member inside said housing.

10 Claims, 2 Drawing Sheets

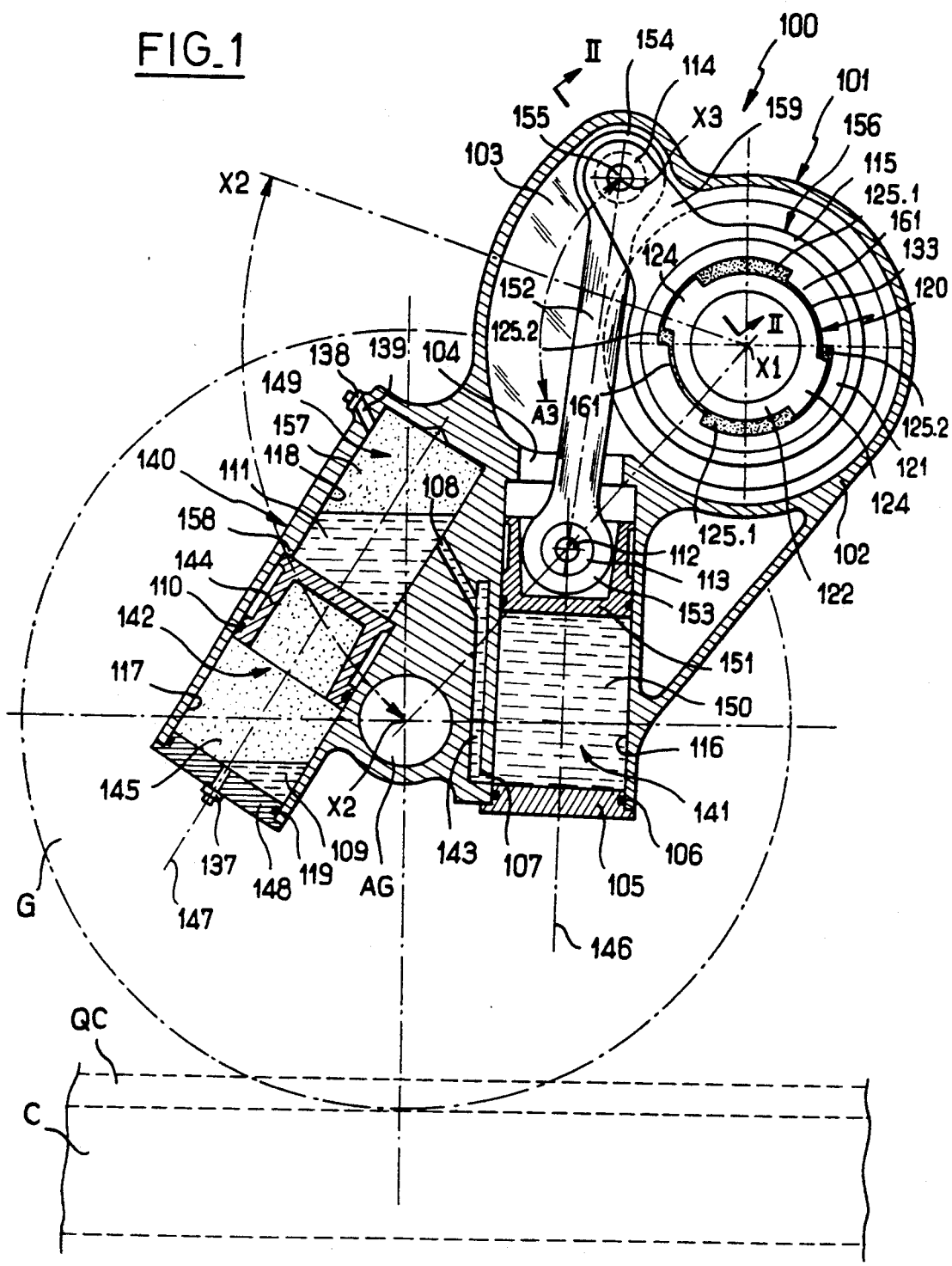
FIG_1

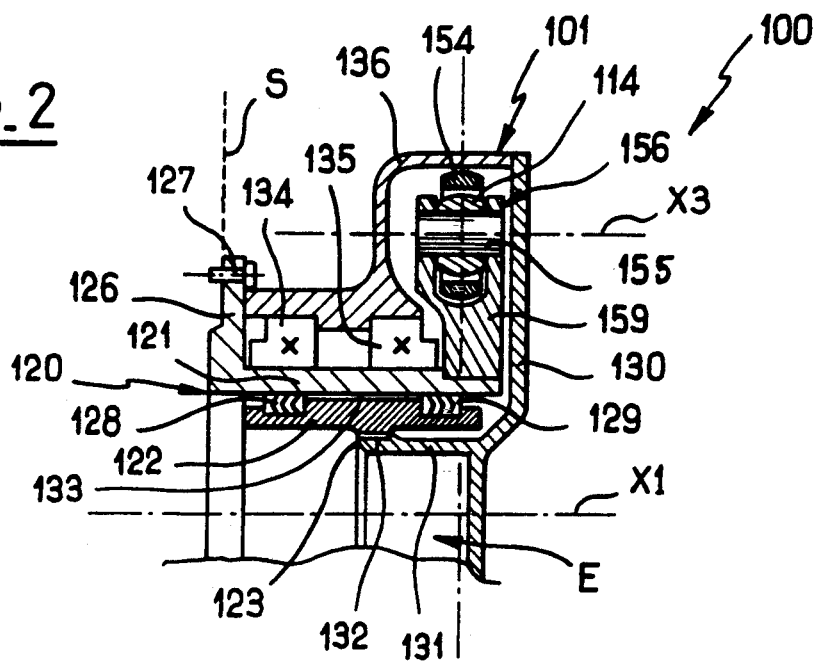
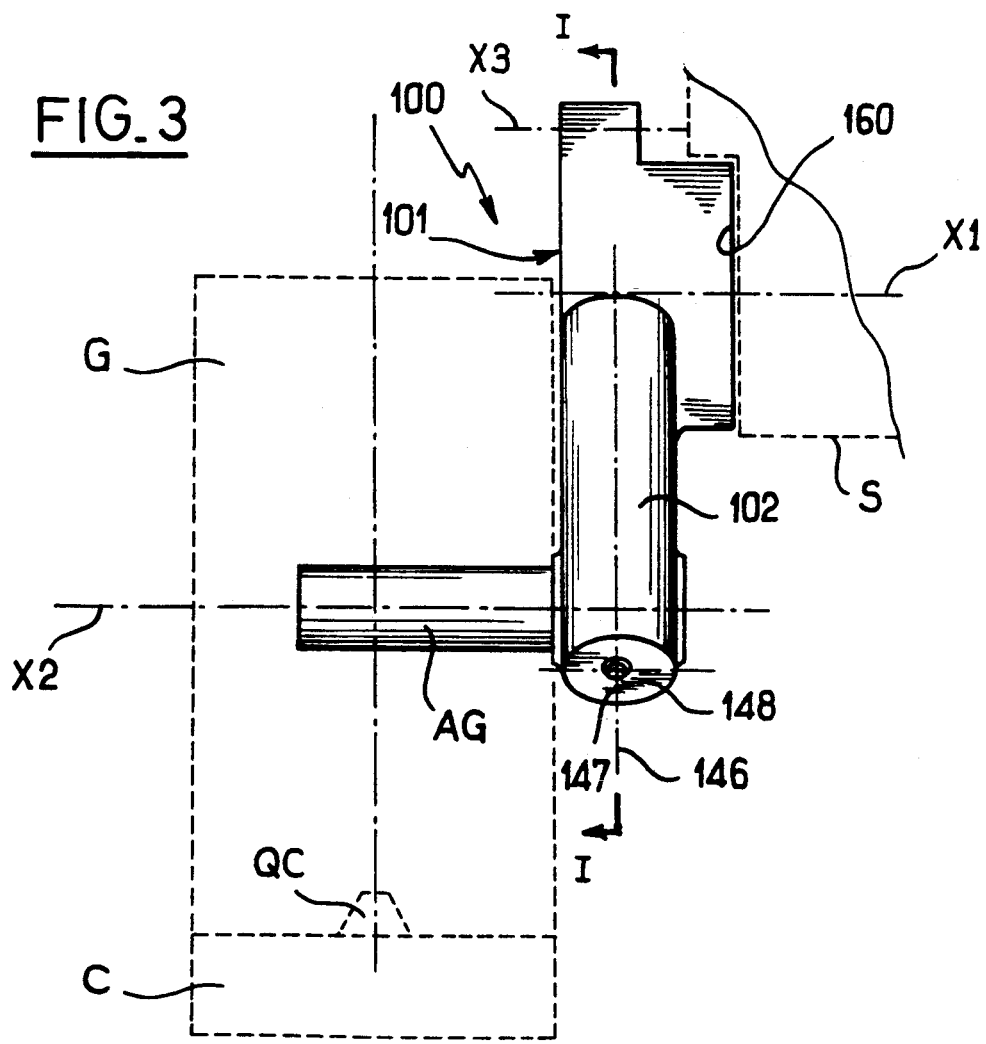

SUSPENSION ASSEMBLY FOR A HEAVY VEHICLE, IN PARTICULAR FOR A TRACKED VEHICLE

The invention relates to a suspension assembly for a heavy vehicle, in particular for a tracked vehicle, the assembly being of the oscillating arm type.

BACKGROUND OF THE INVENTION

Known assemblies comprise an arm mounted to oscillate on a fixed structure that is secured to the chassis of the vehicle, said arm also being fitted with a wheel axle (or stub axle), or with a track wheel when the vehicle is a tracked vehicle such as a tank, said axle being offset relative to the oscillation axis of the arm and being situated beneath it.

In the text below, reference is made to a suspension assembly for a tracked vehicle, however the invention is naturally not limited to that particular application.

Modern tanks include a series of track wheels on either side, generally five or six of them, which support the total static load, and each of which is mounted on a respective oscillating arm. By way of example, the suspended mass per track wheel is of the order of four (metric) tonnes, such that the suspension elements need to be adapted accordingly.

The suspension elements are required not only to support the mass of the vehicle, but also to minimize effects due to movements of the body and effects due to the ground, in particular when going over obstacles at high speed.

More and more use is being made of systems that are integrated within the oscillating arm so as to achieve optimum compactness and protection, with such systems appearing to be more attractive than suspensions having transverse torsion bars, which are bulky and difficult to adjust, without mentioning the drawbacks inherent to passing through the structure.

Suspension assemblies are already known that comprise a housing receiving a shock absorber comprising interleaved friction disks and a single-chamber oleo-pneumatic spring. The shock absorber includes members enabling hydraulic compression to be exerted on the interleaved disks to implement the shock absorbing function (e.g. a cam secured to the housing of the oscillating arm, with a control finger bearing thereagainst that co-operates with the hydraulic braking system).

Such systems are advantageous insofar as the spring and shock absorbing functions are uncoupled from each other, thereby making the suspension less sensitive to temperature variation, however such systems are complex in structure because of the way in which the hydraulic compression members associated with the interleaved friction disks are organized, and consequently because of the sealing required for the corresponding portion of the suspension assembly. In addition, control of the moving finger may suffer from weaknesses under difficult conditions of use.

An object of the invention is to provide an oscillating arm suspension assembly whose structure is both simple and reliable, enabling it to be implemented in highly compact manner that is compatible with a minimum amount of space available therefor (thus making it possible to take little space from the structure of the vehicle).

Another object of the invention is to provide a suspension assembly which suffers little from temperature fluctuations, be they internal or external, and which is as independent as possible therefrom so as to have as small an effect as possible on the vehicle's ground clearance.

Another object of the invention is to provide a suspension assembly making it possible simultaneously to have good dynamic stability for the vehicle and to pass over obstacles in satisfactory manner at high speed.

SUMMARY OR THE INVENTION

More particularly, the present invention provides a suspension assembly for a heavy vehicle, in particular a tracked vehicle, the assembly comprising an arm mounted to oscillate on a fixed structure secured to the chassis of the vehicle, and fitted with an axle for a wheel or a track wheel, said axle being offset relative to the oscillation axis of the arm and being situated beneath it, the assembly being characterized by the fact that the oscillating arm comprises a housing receiving firstly a shock absorber of the type in which a semi-solid elastomer is hydrostatically compressed, said shock absorber being mounted coaxially about the oscillation axis of said arm, and secondly an oleo-pneumatic spring of the two-chamber type, having a hydraulic chamber closed by a sliding piston with a piston rod hinged thereto whose end opposite from the piston is hinged to a fixed member inside said housing.

Preferably, the shock absorber comprises a stator secured to the fixed structure of the vehicle on which the housing of the oscillating arm is rotatably mounted, and inside which there rotates a rotor which is constrained by a lateral closure plate to rotate with the housing, the fixed member on which the piston rod is fixed being made in the form of a fork that is mounted directly on said stator. In particular, the lateral closure plate is fixed via its periphery to the housing, and has a cylindrical extension extending coaxially inside the rotor, said extension and said rotor being coupled to rotate together by means of respective sets of fluting.

It is also advantageous for the housing of the oscillating arm to include two cylindrical wells associated with the oleo-pneumatic spring, said wells being adjacent and communicating with each other via a hydraulic connection channel, a first one of the wells having the piston associated with the piston rod sliding therein, and a second one of the wells having a separator piston sliding therein and associated with a chamber containing gas under high pressure. Implementing two adjacent wells is advantageous both for compactness and for mass distribution.

It is then preferable for the axis of the first well to be substantially vertical when the oleo-pneumatic spring is relaxed. It is then also advantageous for the piston rod to be substantially vertical when the oleo-pneumatic spring is relaxed.

Such a disposition is favorable for distributing the forces exerted on the bearings associated with the housing of the oscillating arm, while still being compatible with a small volume for receiving the suspension assembly.

It is also advantageous for the two cylindrical wells to be disposed on opposite sides of the wheel axle, in order to obtain maximum compactness of the oscillating arm.

Also advantageously, the high pressure gas chamber of the second well is disposed in the lower portion thereof, being delimited by a removable bottom of said well and by the separator piston, said separator piston defining an upper chamber containing a volume of hydraulic fluid in direct communication with the hydraulic chamber of the first well, said volume delimiting a low pressure gas chamber.

Such an organization makes it possible to avoid using a second separating piston in the second well, and it facilitates permanent wetting of the piston rings of the sole separator piston by means of the adjacent hydraulic fluid.

In a particular embodiment, the pressure of the high pressure gas chamber of the second well is selected to be such that the separator piston remains pressed against an associated abutment in the static position and for any vertical force that is less than 1.5 times the vertical force in the static position; it is then advantageous for the chambers of the oleo-pneumatic spring to be dimensioned in such a manner that the compression stroke corresponding to compression forces lying in the range 1 to 1.5 times the static force varies little in comparison with variations in the vertical forces.

BRIEF DESCRIPTION OF THE DRAWINGS

Other characteristics and advantages of the invention appear more clearly in the light of the following description and the accompanying drawings which relate to a particular embodiment. Reference is made to the figures, in which:

FIG. 1 is a section through a suspension assembly in accordance with the invention, associated in this case with a track wheel of a tracked vehicle (the wheel and the track being shown in dashed lines only), and the position illustrated corresponding to the relaxed position;

FIG. 2 is a fragmentary section on II—II of FIG. 1 more clearly distinguishing the rotor and the stator of the shock absorber hydrostatically compresses an elastomer; and FIG. 3 is an overall plan view of the above suspension assembly, showing more clearly how it is connected to the structure of the vehicle (with FIG. 1 thus being a section on I—I of FIG. 3).

MORE DETAILED DESCRIPTION

FIGS. 1 and 3 show a suspension assembly 100 for a heavy vehicle, in particular for a tracked vehicle, with reference S designating a portion of the fixed structure secured to the chassis of said vehicle. The suspension assembly comprises an arm 101 mounted to oscillate relative to the fixed structure S and capable of oscillating about a horizontal axis X1, said arm being fitted with an axle AG for a wheel or a track wheel having, in this case, a track wheel G rotating thereon, which track wheel rests on a track C whose lateral positioning ridge QC can be seen. The axis of rotation of the wheel G is referenced X2, and this axis is offset relative to the oscillation axis X1 of the arm 101, and is situated therebelow.

As can be seen more clearly in FIG. 3, the oscillating arm 101 is mounted in a recess 160 of the structure S, and the space available therefor is extremely small. The following description of the structure of the oscillating arm shows that the way in which the components of the arm are disposed is compatible with the arm being received in such a minimum volume, thereby making it possible to take little volume from the structure S of the vehicle.

According to an essential characteristic of the invention, the oscillating arm 101 comprises a housing 102 that receives firstly a shock absorber 120 of the type in which a semi-solid elastomer is hydrostatically compressed, said shock absorber being mounted coaxially about the oscillation axis X1 of said arm, and secondly an oleo-pneumatic spring 140 of the two-chamber type, having a hydraulic chamber 150 closed by a sliding piston 151 on which a piston rod 152 is mounted whose end 154 distant from the piston is hinged to a fixed member 152 inside said housing.

It can thus be seen that the shock absorbing function and the spring function are highly decoupled, and that the spaces occupied by the members associated with these two functions are restricted to precise regions of the housing of the oscillating arm, and in particular with a shock absorbing chamber 103 receiving the shock absorber 120 based on hydrostatic compression of a semi-solid elastomer, said chamber communicating with the other chambers of the housing 102 solely via a passage 104 associated with the piston rod 152. Such confinement is naturally helpful in obtaining a suspension assembly which suffers little from fluctuations in temperature, be they internal or external, and which is highly independent thereof.

The component members of the shock absorber 120 based on hydrostatic compression of a semi-solid elastomer are now described with reference to FIGS. 1 and 2, with the general principle of such shock absorbers being well known elsewhere.

The shock absorber 120 thus comprises a stator 121 secured to the fixed structure S of the vehicle, with the housing 102 of the oscillating arm 101 being rotatably mounted thereon. The stator 121 is generally cylindrical in shape, having a flange 126 for securing it to the fixed structure S by means of bolts 127. The housing 101 of the oscillating arm has a lateral wall 136 which is shaped so as to make contact with the outer rings of two bearings 134 and 135, e.g. bearings having conical rollers, which are associated with the means for supporting the oscillating arm. Inside the stator 121, a rotor 122 can rotate coaxially relative to the stator, i.e. about the oscillation axis X1 of the arm, said rotor being constrained to rotate with the housing 102 by means of a lateral closure plate 130. In the present example, the lateral closure plate 130 is fixed at its periphery to the housing 102 (e.g. by means of bolts that are not shown), and it has a cylindrical extension 131 which extends coaxially inside the rotor 122, said extension having external fluting 132 co-operating with complementary internal fluting 123 formed inside the rotor 122. The extension 131 and the rotor 122 are thus constrained to rotate together by their respective sets of fluting 123 and 122, thereby causing the rotor to rotate with the housing of the oscillating arm.

As can be seen more clearly in FIG. 1, the rotor 122 and the stator 121 have circumferential cutouts defining two curved chambers in which a semi-solid material is disposed, preferably a silicone elastomer. The rotor 122 thus has two curved projections 124 and the stator 121 has two corresponding projections 161. The semi-solid elastomer can thus flow from one side of the projections 124 to the other during relative movement between the rotor and the stator, passing from one circumferential chamber 125.1 to the corresponding circumferential chamber 125.2 with which it communicates via predetermined clearance 133, such clearance allowing the semi-solid elastomer to pass, which thus flows like a gum under the effect of the hydrostatic compression exerted thereon. As can be seen more clearly in FIG. 2, sealing rings 128 and 129 provide lateral sealing for the elastomer-passing clearance and the above-mentioned circumferential chambers.

The central space E inside the rotor of the shock absorber may naturally be used for housing a compensating member that accumulates air, thereby forming a pressurized expansion chamber, with said compensator being fitted with an associated non-return valve and with a circuit leading to the circumferential chambers associated with the semi-solid elastomer.

The fixed member 156 on which the piston rod 152 is fixed is constituted in this case in the form of a fork directly mounted on the stator 121 via an associated cylindrical portion 115, said fork having an extension 159 carrying a pin 155 associated with the fixed point on which the piston rod 152 is hinged. The corresponding axis is referenced X3 and the piston rod 152 rotates thereabout when the housing 102 of the oscillating arm rotates about the axis X1. As a reminder, a chain-dotted arc shows the trajectory followed by a fixed point on the housing of the oscillating arm, said trajectory being an arc of a circle extending between the axis X3 and a point A3, the axis X2 of the track wheel G then simultaneously moving along an arc of a circle that is likewise represented by a chain-dotted line in FIG. 1.

As can be seen more clearly in the fragmentary section of FIG. 2, the end 154 of the piston rod 152 is hinged on the pin 155 via an associated ball joint 114.

The other end 153 of the rod 152 is hinged on a pin 112 by means of a ball joint 113, said pin being associated with a piston 151 that slides in a bore 116 in a first cylindrical well 141 formed in the housing 102 of the oscillating arm. This first well 141 thus includes the above-mentioned hydraulic chamber 150 whose top is delimited by the sliding piston 151, and whose bottom is delimited by a removable bottom 105 which is assembled thereto in a manner that is sealed by an associated sealing ring 106. The housing 102 of the oscillating arm 101 includes another cylindrical well 142 adjacent to the first well 141, and in communication therewith via a hydraulic connection channel 143. The hydraulic connection channel 143 thus connects a bottom orifice 107 of the chamber 150 to a top orifice 108 of the second cylindrical well. These two cylindrical wells 141 and 142 which are associated with the oleo-pneumatic spring 140 are disposed, in this case, on opposite sides of the wheel axis AG, in order to obtain maximum compactness of the oscillating arm 101.

The second well 142 includes a first bore 117 in which a separator piston 144 slides, with sealing being provided by a piston ring 110. This separator piston 144 co-operates with a removable bottom 148 that closes the second well 142 to delimit a bottom chamber 145 containing gas under high pressure (e.g. nitrogen), which may be inflated via a conventional valve 137, and which has a small volume of hydraulic fluid 109 at the bottom thereof. The bottom is sealed by means of a sealing ring 119. In the position shown in FIG. 1, which corresponds to a relaxed position, the separator piston 144 bears against an abutment 158 which is constituted by a shoulder in the housing of the oscillating arm. The second well 142 also has a second cylindrical bore 118, and the separator piston 144 thus delimits a top chamber 149 containing a volume of hydraulic fluid 111 in direct communication with the hydraulic chamber 150 of the first well 141 (via the hydraulic connection channel 143), said volume 111 of the hydraulic fluid directly delimited a low pressure gas chamber 157 (e.g. nitrogen). This upper chamber 149 can be filled and inflated by means of a top hole 139 and an associated valve 138 of conventional design.

It should be observed that the axis 146 of the first well 141 is substantially vertical when the oleo-pneumatic spring 140 is relaxed, as shown in FIG. 1. The axis 147 of the second well 142 is then slightly inclined, while still occupying the same median plane perpendicular to the axes X1, X2, and X3. The piston rod 152 is also substantially vertical when the oleo-pneumatic spring 140 is relaxed.

The vertical disposition of the first well of the housing, and of the piston rod when the suspension assembly is relaxed presents numerous advantages: forces are transmitted in a manner that is favorable; and it is thus possible also to establish a reaction torque (at the center of the wheel and at the fixed hinge point of the piston rod) that substantially unloads the bearings associated with the housing of the arm, with this being because of the lateral disposition of the piston rod. This off-loading of the bearings is even more advantageous given that the space available for receiving the oscillating arm is small.

The suspension assembly 100 is shown in its relaxed position in FIG. 1. When this assembly is subjected to a vertical force while in a static position associated with the corresponding mass of the vehicle, the housing of the oscillating arm rotates about the axis X1 and consequently the piston 151 is pushed into the first well 141. This movement of the piston urges hydraulic fluid from the chamber 152 along the connection channel 143 into the upper chamber 149 of the second well 142. In this context, it should be observed that the section of the connection channel 143 should not be too small in order to avoid any throttling effect which would be undesirable in the present instance, insofar as it is required to act as an oleo-pneumatic element that performs the spring function only, i.e. without any additional shock absorption. The increase in the volume of hydraulic fluid in the upper chamber 149 has the effect of compressing the gas contained in the upper portion of said chamber: this provides the first stiffness of the oleo-pneumatic spring. Beyond a certain threshold, corresponding to a predetermined vertical force (which may be less than 1.5 times the vertical force in the static position, for example), the pressure of the gas in the upper chamber of the second well becomes great enough to displace the separator piston 144, thus corresponding to the second portion of the stiffness curve. The dimensioning of the chambers of the oleo-pneumatic spring is preferably designed in such a manner that the compression stroke corresponding to forces lying between 1 and 1.5 times the static force varies little relative to changes in the vertical forces.

For example, for a total stroke of 500 mm, the corresponding static stroke is equivalent to the track wheel rising through 150 mm, thus allowing the wheel to move vertically relative to its static position through 350 mm in compression and 150 mm in extension. The force threshold corresponding to the separator piston being displaced may correspond to a stroke of about 170 mm which is relatively little compared with variations in vertical forces. This makes it possible to combine both the possibility of passing over obstacles in satisfactory manner at high speed, and also of obtaining good dynamic stability for the vehicle.

The suspension assembly as described above suffers little from fluctuations in temperature, be they internal or external, and is highly independent thereof, such that the ground clearance of the vehicle is affected as little as possible thereby. The structure of the oscillating arm is both simple and reliable, and it makes a highly compact implementation possible that is compatible with a minimum volume available for receiving it.

The invention is not limited to the embodiment described above, but on the contrary it covers to any variant that uses equivalent means to reproduce the essential characteristics specified above.

We claim:

1. A suspension assembly for a heavy vehicle, the assembly comprising an arm mounted to oscillate on a fixed structure secured to the chassis of the vehicle, and fitted with an axle for a wheel, said axle being offset relative to the oscillation of the arm and being situated beneath said oscillation axis, wherein the oscillating arm comprises a housing receiving firstly a shock absorber comprising a semi-solid elastomer which is hydrostatically compressed, said shock absorber being mounted coaxially about the oscillation axis of said arm, and secondly an oleo-pneumatic spring of the two-chamber type, having a hydraulic chamber closed by a sliding piston with a piston rod hinged thereto whose end opposite from the piston is hinged to a fixed member inside said housing.

2. A suspension assembly according to claim 1, wherein the shock absorber comprises a stator secured to the fixed structure of the vehicle on which the housing of the oscillating arm is rotatably mounted, and in the stator surrounds a rotor which is constrained by a lateral closure plate to rotate with the housing, the fixed member on which the piston rod is fixed being a fork that is mounted directly on said stator.

3. A suspension assembly according to claim 2, wherein the lateral closure plate is fixed via its periphery to the housing, and has a cylindrical extension extending coaxially inside the rotor, said extension and said rotor being coupled to rotate together by means of respective sets of fluting.

4. A suspension assembly according to claim 1, wherein the housing of the oscillating arm includes two cylindrical wells associated with the oleo-pneumatic spring, said wells being adjacent and communicating with each other via a hydraulic connection channel, a first one of the wells having the piston associated with the piston rod sliding therein, and a second one of the wells having a separator piston sliding therein and associated with a chamber containing gas under high pressure.

5. A suspension assembly according to claim 4, wherein the axis of the first well is substantially vertical when the oleo-pneumatic spring is relaxed.

6. A suspension assembly according to claim 4, wherein the piston rod is substantially vertical when the oleo-pneumatic spring is relaxed.

7. A suspension assembly according to claim 4, wherein the two cylindrical wells are disposed on opposite sides of the wheel axle, in order to obtain maximum compactness of the oscillating arm.

8. A suspension assembly according to claim 4, wherein the high pressure gas chamber of the second well is disposed in a lower portion thereof, being delimited by a removable bottom of said well and by the separator piston, said separator piston delimiting an upper chamber containing a volume of hydraulic fluid in direct communication with the hydraulic chamber of the first well, said volume defining a low pressure gas chamber.

9. A suspension assembly according to claim 8, wherein the pressure of the high pressure gas chamber of the second well is selected to be such that the separator piston remains pressed against an associated abutment in a static position and for any vertical force that is less than 1.5 times the vertical force in the static position.

10. A suspension assembly according to claim 9, wherein the chambers of the oleo-pneumatic spring are dimensioned in such a manner that the compression stroke corresponding to compression forces lying in the range 1 to 1.5 times the static force varies little in comparison with variations in vertical forces.

* * * * *